(12) United States Patent
Lee

(10) Patent No.: US 9,525,349 B1
(45) Date of Patent: Dec. 20, 2016

(54) POWER SUPPLY DECOUPLING CIRCUIT WITH DECOUPLING CAPACITOR

(71) Applicant: VIA Alliance Semiconductor Co., Ltd., Shanghai (CN)

(72) Inventor: Yeong-Sheng Lee, Fremont, CA (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 14/874,861

(22) Filed: Oct. 5, 2015

(51) Int. Cl.
  *G05F 1/10* (2006.01)
  *H02M 3/158* (2006.01)
(52) U.S. Cl.
  CPC .................... *H02M 3/158* (2013.01)
(58) Field of Classification Search
  CPC ............ H03K 19/018514; H03K 19/21; H03H 11/0405
  USPC ........ 327/541, 540, 538, 552, 539, 542, 543
  See application file for complete search history.

(56) References Cited

U.S. PATENT DOCUMENTS

| | | | |
|---|---|---|---|
| 7,719,310 B2 | 5/2010 | Yokoi et al. | |
| 9,337,842 B1 * | 5/2016 | Lee | H03K 19/018514 |
| 2006/0049868 A1 * | 3/2006 | Yeh | G09G 3/3696 327/538 |
| 2014/0292399 A1 | 10/2014 | Kashiwakura | |
| 2016/0149578 A1 * | 5/2016 | Lee | H03K 19/018528 327/108 |

FOREIGN PATENT DOCUMENTS

| | | |
|---|---|---|
| CN | 102298957 | 12/2011 |
| CN | 204668917 | 9/2015 |

* cited by examiner

*Primary Examiner* — Lincoln Donovan
*Assistant Examiner* — Thomas Skibinski
(74) *Attorney, Agent, or Firm* — McClure, Qualey & Rodack, LLP

(57) ABSTRACT

A power supply decoupling circuit includes an operational amplifier, a capacitor, a source resistor, and a stabilization circuit. The operational amplifier has a positive input terminal coupled to a first reference voltage, a negative input terminal coupled to a common supply node, and an output terminal. The capacitor is coupled between the common supply node and the output terminal of the operational amplifier. The source resistor is coupled between a supply voltage and the common supply node. The stabilization circuit is coupled between the common supply node and a ground voltage. The stabilization circuit stabilizes a voltage level of the common supply node when the voltage level of the common supply node is below a second reference voltage. The common supply node is configured to drive external circuits with the supply voltage as power supply of the external circuits.

13 Claims, 6 Drawing Sheets

POWER SUPPLY DECOUPLING CIRCUIT WITH DECOUPLING CAPACITOR

BACKGROUND OF THE INVENTION

Field of the Invention

The disclosure generally relates to a power supply decoupling circuit, and more specifically, to a power supply decoupling circuit with a decoupling capacitor.

Description of the Related Art

A decoupling capacitor is a capacitor used to decouple one part of a circuit from another. Noise caused by other circuit elements is shunted through the capacitor, thereby reducing the effect it has on the rest of the circuit. An alternative name of decoupling capacitor is bypass capacitor because it is used to bypass the power supply or other high-impedance components of a circuit.

A power supply decoupling circuit with a decoupling capacitor usually occupies relatively large area. Typically, a conventional power supply decoupling circuit needs almost ⅓ of the chip area to accommodate the layout of a decoupling capacitor. The conventional design not only increases the total chip size but also results in longer jitter components due to its large RC constant. Accordingly, there is a need to design a novel power supply decoupling circuit to overcome the drawbacks of the prior art.

BRIEF SUMMARY OF THE INVENTION

In a preferred embodiment, the invention is directed to a power supply decoupling circuit, including: a first operational amplifier, wherein the first operational amplifier has a positive input terminal coupled to a first reference voltage, a negative input terminal coupled to a common supply node, and an output terminal; a capacitor, coupled between the common supply node and the output terminal of the first operational amplifier; a source resistor, coupled between a supply voltage and the common supply node; and a stabilization circuit, coupled between the common supply node and a ground voltage, and stabilizing a voltage level of the common supply node when the voltage level of the common supply node is below a second reference voltage, wherein the common supply node is configured to drive external circuits with the supply voltage as power supply of the external circuits.

In some embodiments, the source resistor is formed by a parasitic metal resistance of an integrated circuit layout.

In some embodiments, the stabilization circuit includes: a second operational amplifier, wherein the second operational amplifier has a positive input terminal coupled to the common supply node, a negative input terminal coupled to the second reference voltage, and an output terminal; and a second transistor, wherein the second transistor has a control terminal coupled to the output terminal of the second operational amplifier, a first terminal coupled to a relatively high supply voltage, and a second terminal coupled to the common supply node.

In some embodiments, the stabilization circuit further includes: a first transistor, wherein the first transistor has a control terminal coupled to the output terminal of the second operational amplifier, a first terminal coupled to the control terminal of the second transistor, and a second terminal coupled to the relatively high supply voltage; and a current sink, coupled between the first terminal of the first transistor and the ground voltage.

In some embodiments, the second reference voltage has a voltage level slightly lower than that of the supply voltage.

In some embodiments, the relatively high supply voltage has a voltage level higher than that of the supply voltage.

In some embodiments, the second operational amplifier uses the relatively high supply voltage as an operation voltage.

In a preferred embodiment, the invention is directed to a power supply decoupling circuit, including: a source resistor, coupled between a supply voltage and a common supply node, wherein the common supply node is configured to drive external circuits with the supply voltage as power supply of the external circuits; a decoupling capacitor, coupled between the common supply node and a ground voltage; and a stabilization circuit, stabilizing a voltage level of the common supply node when the voltage level of the common supply node is below a second reference voltage, including: a second operational amplifier, wherein the second operational amplifier has a positive input terminal coupled to the common supply node, a negative input terminal coupled to the second reference voltage, and an output terminal; and a second transistor, wherein the second transistor has a control terminal coupled to the output terminal of the second operational amplifier, a first terminal coupled to a relatively high supply voltage, and a second terminal coupled to the common supply node.

In some embodiments, the source resistor is formed by a parasitic metal resistance of an integrated circuit layout.

In some embodiments, the stabilization circuit further includes: a first transistor, wherein the first transistor has a control terminal coupled to the output terminal of the second operational amplifier, a first terminal coupled to the control terminal of the second transistor, and a second terminal coupled to the relatively high supply voltage; and a current sink, coupled between the first terminal of the first transistor and the ground voltage.

In some embodiments, the second reference voltage has a voltage level slightly lower than that of the supply voltage.

In some embodiments, the relatively high supply voltage has a voltage level higher than that of the supply voltage.

In some embodiments, the second operational amplifier uses the relatively high supply voltage as an operation voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Figure 1:
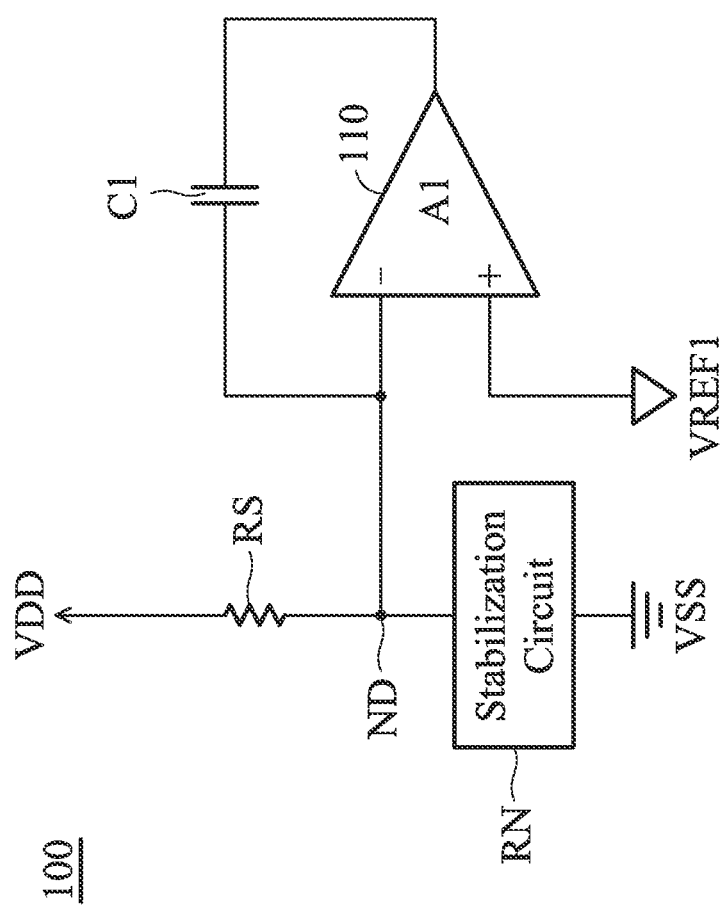
FIG. 1 is a diagram of a power supply decoupling circuit according to an embodiment of the invention.

FIG. 1 is a diagram of a power supply decoupling circuit 100 according to an embodiment of the invention. The power supply decoupling circuit 100 may be applied in a mobile device, such as a smartphone, a tablet computer, or a notebook computer, which includes circuits and power supplies for the circuits. The power supply decoupling circuit 100 includes a first operational amplifier 110, a capacitor C1, a source resistor RS, and a stabilization circuit RN. The first operational amplifier 110 has a positive input terminal coupled to a first reference voltage VREF1, a negative input terminal coupled to a common supply node ND, and an output terminal. The capacitor C1 is coupled between the common supply node ND and the output terminal of the first operational amplifier 110. A decoupling capacitor circuit is formed by the capacitor C1 and the first operational amplifier 110. The source resistor RS is coupled between a supply voltage VDD and the common supply node ND. The supply voltage VDD may serve as a power supply for circuits of the device applying the power supply decoupling circuit 100. The source resistor RS may not be an independent resistor, and it may be formed by a parasitic metal resistance of an integrated circuit layout. That is, the non-ideal resistance from the supply voltage VDD is modeled as the source resistor RS. A stabilization circuit RN is coupled between the common supply node ND and a ground voltage VSS. The stabilization circuit RN is formed by active components and configured to stabilize a voltage level of the common supply node ND when the voltage level of the common supply node ND drops below a certain voltage. In addition, since the stabilization circuit RN is coupled in parallel with the source resistor RS, the stabilization circuit RN reduces for the non-ideal resistance of the source resistor RS, and therefore reduces the RC constant of the power supply decoupling circuit 100. The detailed structure of the stabilization circuit RN will be described in the following embodiments. It should be understood the embodiments are just exemplary, rather than limitations of the invention.

Figure 2:
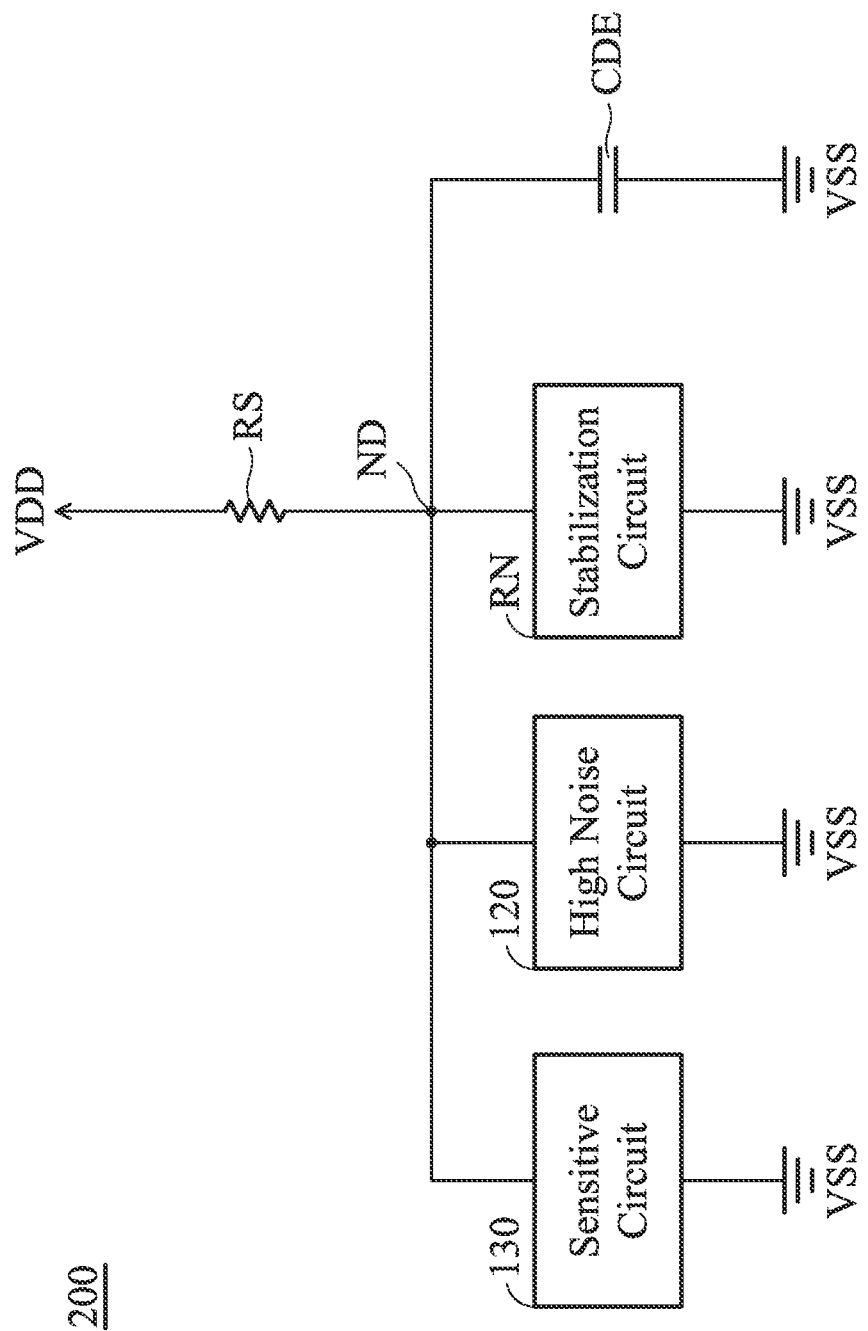
FIG. 2 is a diagram of a power supply decoupling circuit according to an embodiment of the invention.

FIG. 2 is a diagram of a power supply decoupling circuit 200 according to an embodiment of the invention. FIG. 2 is similar to FIG. 1. In the embodiment of FIG. 2, the common supply node ND of the power supply decoupling circuit 200 is configured to drive a high noise circuit 120 and a sensitive circuit 130 with the supply voltage VDD as their power supply. The high noise circuit 120 and the sensitive circuit 130 may be external circuits coupled to the common supply node ND of the power supply decoupling circuit 200. The high noise circuit 120 may include a digital logic circuit, such as an inverter, an NAND gate, an NOR gate, or a combination thereof, and its switching operation may result in high-frequency noise in the voltage level of the common supply node ND that drives the external circuits. The sensitive circuit 130 may include an analog circuit, such as an ADC (Analog-to-Digital Converter) or a PLL (Phase-Locked Loop), and its operation may be very sensitive to noise in the voltage level of the common supply node ND. Since the sensitive circuit 130 tends to be affected by noise in the voltage level of the common supply node ND due to the high noise circuit 120, a large decoupling capacitor circuit CDE is coupled to the common supply node ND, thereby eliminating the interference therefrom. The decoupling capacitor circuit CDE may be a general parallel-plate capacitor, or an active decoupling capacitor circuit as shown in FIG. 1. In the embodiment of FIG. 1, the active decoupling capacitor circuit is formed by the capacitor C1 and the first operational amplifier 110. The negative feedback mechanism of the first operational amplifier 110 increases the equivalent capacitance of the active decoupling capacitor circuit. For example, the equivalent capacitance of the active decoupling capacitor circuit may be calculated as the following equation (1).

$$CDE \approx A1 \times C1 \qquad (1)$$

where CDE represents the equivalent capacitance of the active decoupling capacitor circuit, A1 represents the open-loop gain of the first operational amplifier 110, and C1 represents the capacitance of the capacitor C1.

That is, the equivalent capacitance of the active decoupling capacitor circuit can be approximately calculated by multiplying the capacitance of the capacitor C1 by the open-loop gain A1 of the first operational amplifier 110 due to the Miller effect. Such an active decoupling capacitor circuit can provide a large equivalent capacitance but does not occupy too large area on the chip. However, the large capacitance also results in a large RC constant, thereby degrading the performance of the power supply decoupling circuit 200. For example, the jitter components at the common supply node ND may become longer and more severe due to the large RC constant, and it affects the performance of the power supply decoupling circuit 200. In the invention, the aforementioned problem can be solved by appropriately designing the stabilization circuit RN in the power supply decoupling circuit 200. Please refer to the detailed descriptions of the following embodiments.

Figure 3:
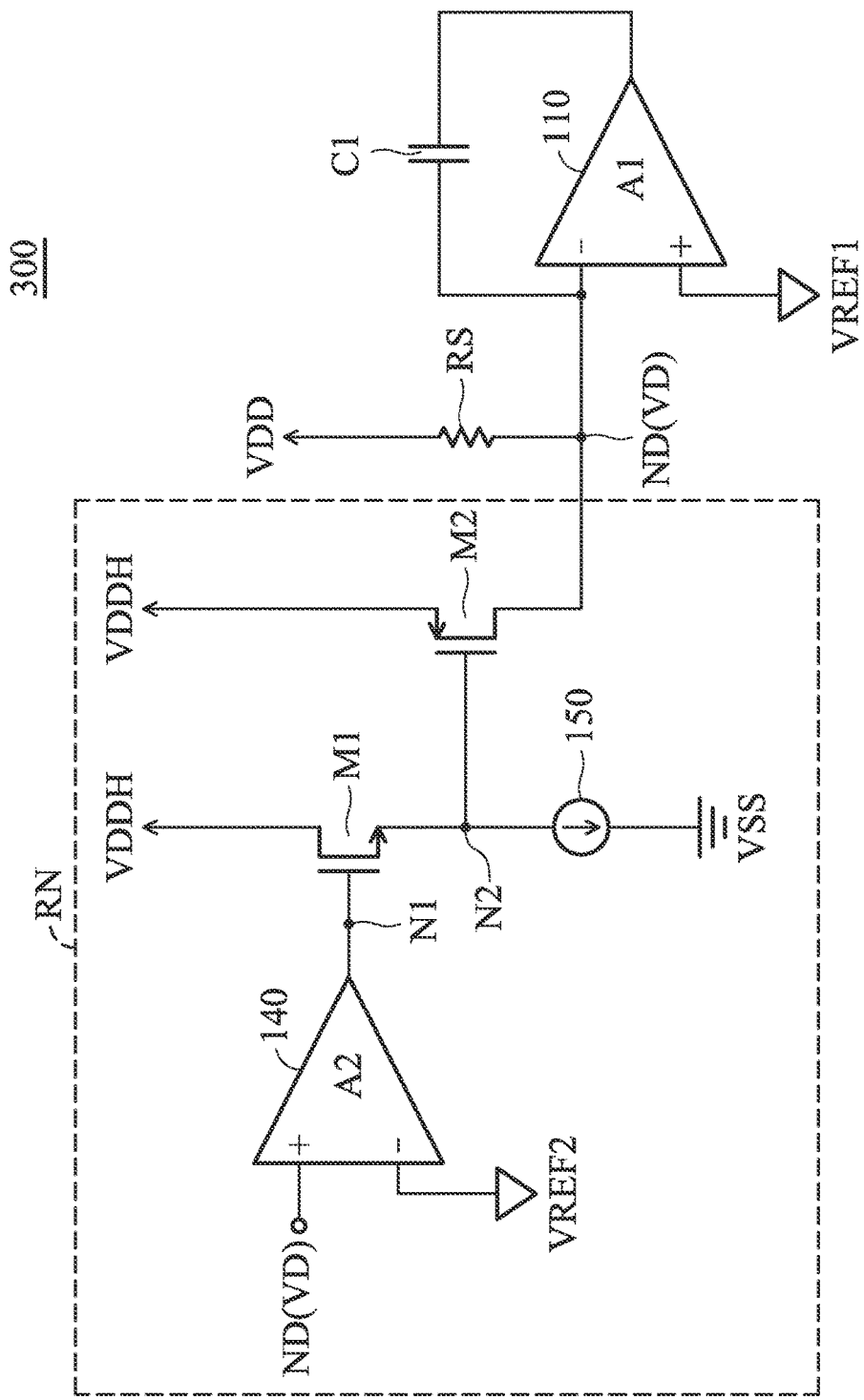
FIG. 3 is a diagram of a power supply decoupling circuit according to an embodiment of the invention.

FIG. 3 is a diagram of a power supply decoupling circuit 300 according to an embodiment of the invention. FIG. 3 is similar to FIG. 1 and FIG. 2, and circuits driven by the common supply node ND (as in FIG. 2) are not shown. In the embodiment of FIG. 3, the stabilization circuit RN of the power supply decoupling circuit 300 includes a second operational amplifier 140, a first transistor M1, a current sink 150, and a second transistor M2. The second operational amplifier 140 has a positive input terminal coupled to the common supply node ND, a negative input terminal coupled to a second reference voltage VREF2, and an output terminal coupled to a first node N1, wherein the second reference voltage VREF2 may be designed to be slightly lower than the supply voltage VDD so that the output terminal outputs logic "low" at the first node N1 when a voltage level VD at the common supply node ND drops significantly below its ideal level (i.e., voltage level of the supply voltage VDD) due to switching operations of the high noise circuit 120, and the output terminal outputs logic "high" at the first node N1 when the voltage level VD is at its ideal level (i.e., the normal situation). The first transistor M1 may be an NMOS transistor (N-type Metal Oxide Semiconductor Field Effect Transistor). The first transistor M1 has a control terminal coupled to the first node N1, a first terminal coupled to a second node N2, and a second terminal coupled to a relatively high supply voltage VDDH. The relatively high supply voltage VDDH may be higher than the supply voltage VDD so that the stabilization circuit RN does not draw current from the common supply node ND and result in undesirable current leakage. In one embodiment, the second operational amplifier 140 uses the relatively high supply voltage VDDH as its operation voltage, and thus the output terminal of the second operational amplifier 140 may be at a voltage level approximately the same as that of the relatively high supply voltage VDDH to indicate logic "high" and may be at a voltage level approximately the same as that of the ground voltage VSS to indicate logic "low"; in other embodiments, other voltage levels may be designed to indicate logic "high" or "low" by designing the operation voltage of the second operational amplifier 140, which is well known to those skilled in the art and will not be described here. The current sink 150 is coupled between the second node N2 and the ground voltage VSS, and is configured to draw a current from the second node N2. The second transistor M2 may be a PMOS transistor (P-type Metal Oxide Semiconductor Field Effect Transistor). The second transistor M2 has a control terminal coupled to the second node N2, a first terminal coupled to the relatively high supply voltage VDDH, and a second terminal coupled to the common supply node ND. When the voltage level VD is at its ideal level (i.e., above the second reference voltage VREF2), the first node N1 is logic "high" and thus the first transistor M1 turns on, and the second node N2 has a voltage level lower than that of the first node N1 (i.e., the voltage level of the relatively high supply voltage VDDH) by approximately a threshold voltage of the first transistor M1, which in turn keeps the second transistor M2 in a state that is marginally turning on (i.e., close to being turned on but not fully turned on). When the voltage level VD drops significantly below its ideal level (i.e., below the second reference voltage VREF2), the first node N1 is logic "low" and thus the first transistor M1 turns off; since no current is flowing through the second node N2, the second node N2 has a voltage level same as that of the ground voltage VSS, and thus the second transistor M2 is fully turned on to rapidly pull up the voltage level VD at the common supply node ND. By keeping the second transistor M2 in a state that is marginally turning on when the voltage level VD is at its ideal level, the second transistor M2 may be fully turned on faster when the voltage level VD drops, and the response of the power supply decoupling circuit 300 may be enhanced; in other words, the first transistor M1 and the current sink 150 serve as a buffer stage of the stabilization circuit RN. In another embodiment, the first transistor M1 and the current sink 150 may be omitted, and the output terminal of the second operational amplifier 140 may be coupled to the control terminal of the second transistor M2, so that the second transistor M2 is turned off when the voltage level VD is at its ideal level. In still another embodiment, the first transistor M1 and the current sink 150 may be omitted, and the output terminal of the second operational amplifier 140 may be designed to be at a voltage level slightly lower than that of the relatively high supply voltage VDDH to indicate logic "high" (as described in above), so that the second transistor M2 is marginally turning on without using the buffer stage. In still other embodiments, more than one buffer stage may be coupled between the second operational amplifier 140 and the second transistor M2 to further enhance the response of the power supply decoupling circuit 300.

Figure 4:
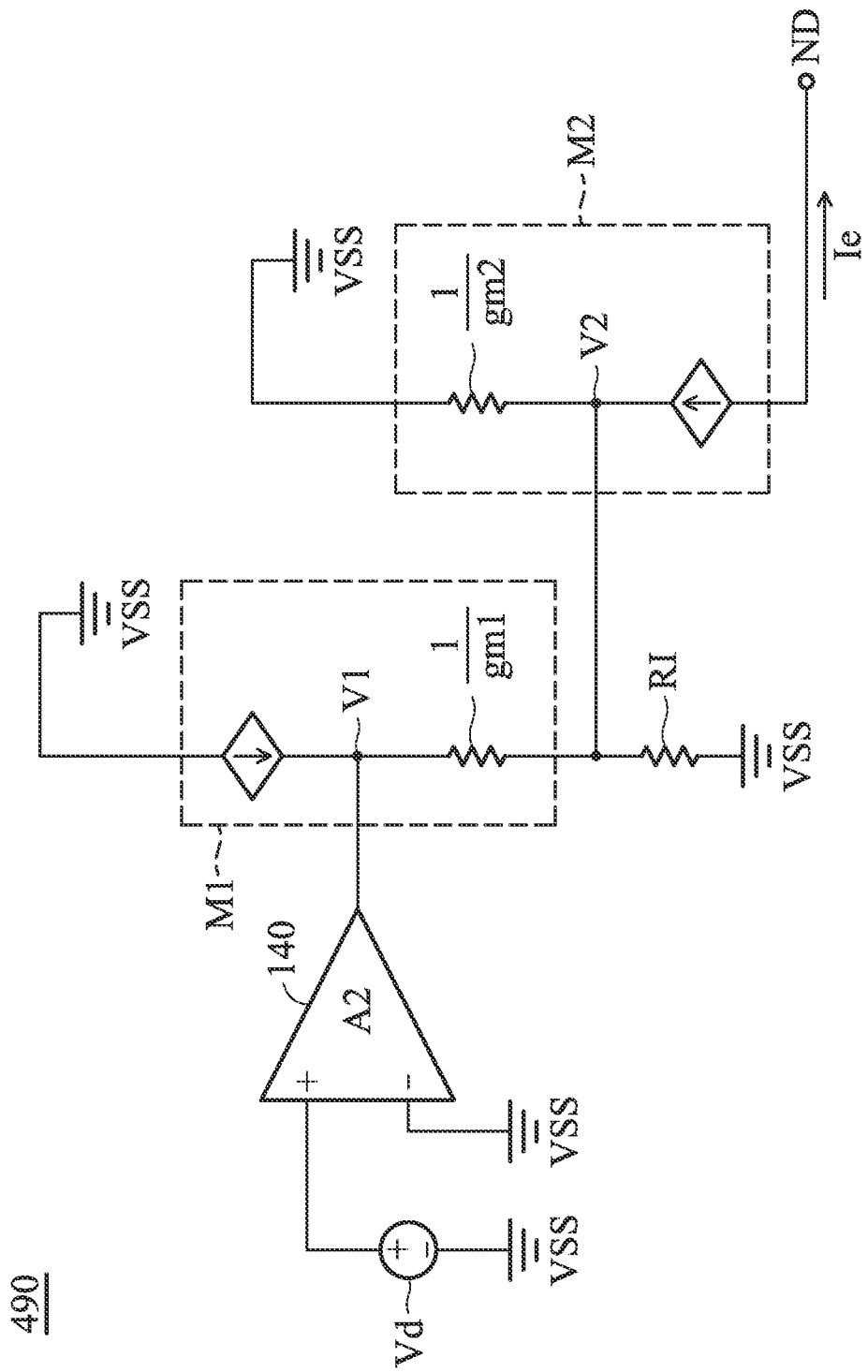
FIG. 4 is a diagram of a small-signal model of a stabilization circuit according to an embodiment of the invention.

FIG. 4 is a diagram of a small-signal model 490 of the stabilization circuit RN according to an embodiment of the invention. The small-signal model 490 is used to describe the operation theory of the stabilization circuit RN. In AC (Alternative Current) analysis, the second reference voltage VREF2, the relatively high supply voltage VDDH, and the supply voltage VDD are all replaced with the ground voltage VSS. The first transistor M1 and the second transistor M2 operate in saturation modes, and each of them is represented as a respective T-model of MOSFET. The current sink 150 is replaced with a current sink resistor RI having a very large resistance. In order to calculate the equivalent impedance of the stabilization circuit RN, a small-signal (AC) voltage source Vd is added, and it is coupled between the positive input terminal of the second operational amplifier 140 (i.e., the common supply node ND) and the ground voltage VSS. The equivalent impedance of the stabilization circuit RN is derived as the following equations (2)-(5).

$$V1 = Vd \times A2 \quad (2)$$

where V1 represent the voltage at the control terminal of the first transistor M1, Vd represent the voltage difference of the small-signal voltage source Vd, and A2 represents the open-loop gain of the second operational amplifier 140.

$$V2 = V1 \times \frac{RI}{RI + \frac{1}{gm1}} \approx V1 \quad (3)$$

where V2 represent the voltage at the control terminal of the second transistor M2, RI represent the resistance of the current sink resistor RI, and gm1 represents the transconductance of the first transistor M1. It should be noted that V2 is approximately equal to V1 when the resistance of the current sink resistor RI approaches to infinity.

$$Ie = -V2 \times gm2 = -Vd \times A2 \times gm2 \quad (4)$$

where Ie represents the output current from the stabilization circuit RN to the common supply node ND, and gm2 represents the transconductance of the second transistor M2.

$$RN = -\frac{Vd}{Ie} = \frac{Vd}{Vd \times A2 \times gm2} = \frac{1}{A2 \times gm2} \quad (5)$$

where RN represents the equivalent impedance of the stabilization circuit RN. Therefore, the equivalent impedance of the stabilization circuit RN coupled in parallel with the source resistor RS reduces the overall equivalent resistance and thus the RC constant, which further improves the performance of the power supply decoupling circuit 300. Since the buffer stage has unity gain, removing the buffer stage or adding more buffer stages (as described in above) has little effect on the equivalent impedance of the stabilization circuit RN. In other embodiments, additional amplifying stages with non-unity gain may also be coupled between the second operational amplifier 140 and the second transistor M2 to adjust the equivalent impedance of the stabilization circuit RN, which is well known to those skilled in the art and will not be described here.

Figure 5:
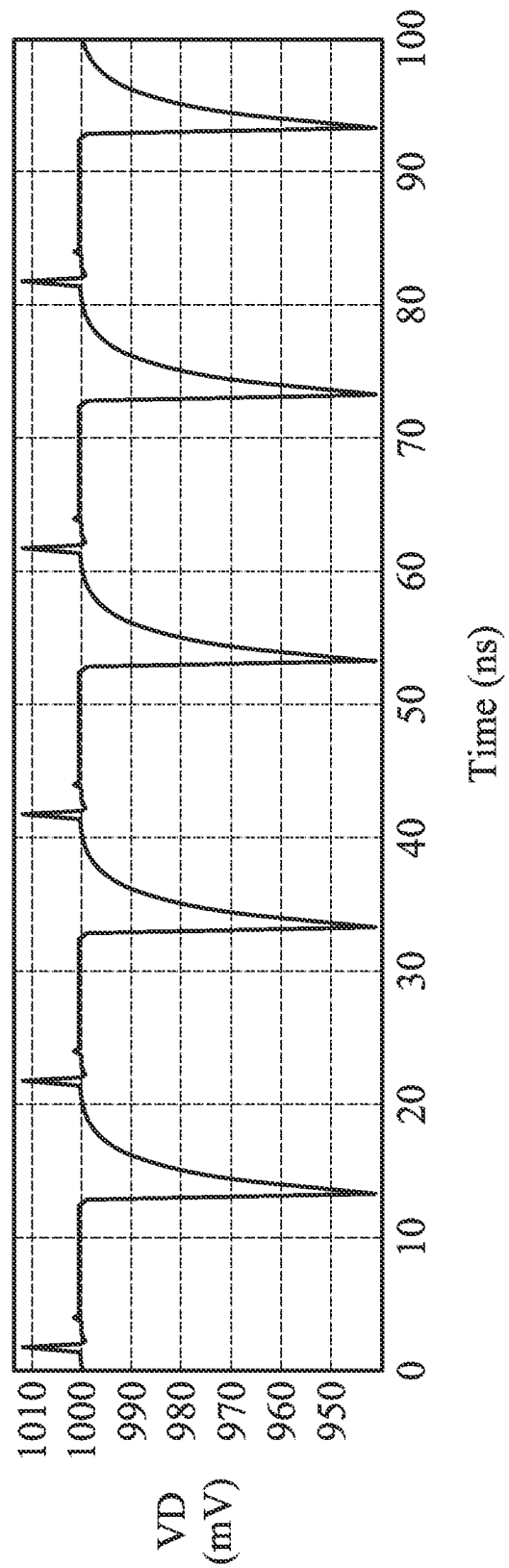
FIG. 5 is a diagram of waveform of a voltage at a common supply node when no stabilization circuit is used.
Figure 6:
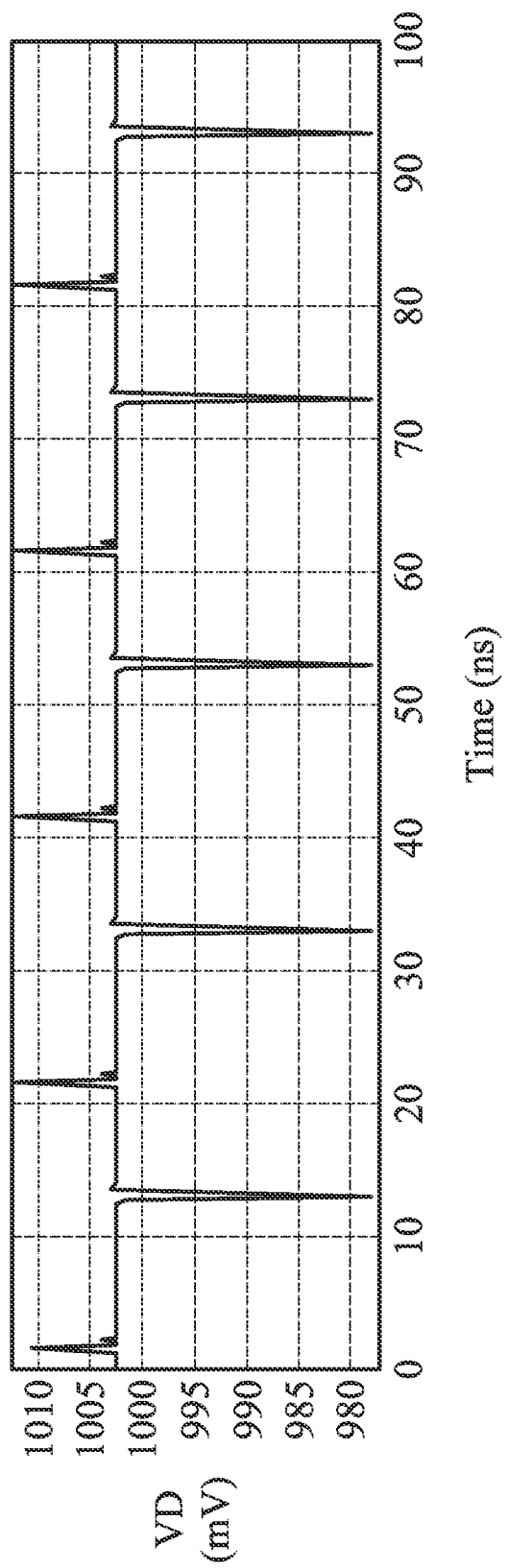
FIG. 6 is a diagram of waveform of a voltage at a common supply node when a stabilization circuit is added, according to an embodiment of the invention.

After the stabilization circuit RN is added and coupled in parallel with the source resistor RS, the non-ideal characteristic of the source resistor RS may be improved by designing the parameters such as the open-loop gain A2 of the second operational amplifier 140 or the transconductance gm2 of the second transistor M2, and the RC constant of the power supply decoupling circuit 300 is significantly reduced. The stabilization circuit RN may work with either general parallel-plate capacitors or active decoupling capacitor circuits in the power supply decoupling circuit 300. FIG. 5 is a diagram of waveform of a voltage VD at the common supply node ND when no stabilization circuit is used. FIG. 6 is a diagram of waveform of the voltage VD at the common supply node ND when the proposed stabilization circuit RN is added, according to an embodiment of the invention. The jitter components at the common supply node ND may result from the operations of the high noise circuit 120. Upon the simulations of FIG. 5 and FIG. 6, it should be noted that the width of each jitter peak in the time axis becomes much narrower if the stabilization circuit RN is used, and the amplitude of each jitter peak is also reduced. With such a design, the jitter components at the common supply node ND have shorter durations and smaller amplitudes, and they have a smaller impact on the output performance of the power supply decoupling circuit 300.

In some embodiments, the parameters of the power supply decoupling circuits 100, 200, and 300 are as follows. The capacitance of the capacitor C1 is about 10 pF. The first reference voltage VREF1 is a DC (Direct Current) bias voltage ranging from about 0V to about 1V. The second reference voltage VREF2 is another DC bias voltage around 0.995V. The supply voltage VDD is constant 1V. The relatively high supply voltage VDDH is constant 1.8V. The open-loop gain A1 of the first operational amplifier 110 is greater than 10. The open-loop gain A2 of the second operational amplifier 140 is greater than 50. The ratio of the aspect ratio (W/L) of the second transistor M2 to that of the first transistor M1 is at least 10:1. The above parameters may be modified by those skilled in the art according to different requirements and the invention is not limited thereto.

The invention proposes a novel design of power supply decoupling circuit with a decoupling capacitor. In conclusion, the proposed power supply decoupling circuit has at least the following advantages, compared with the prior art: (1) reducing the chip area which is occupied by the decoupling capacitor; (2) increasing the equivalent capacitance of the decoupling capacitor; and (3) decreasing the total RC constant and shortening the duration of each jitter component, and reducing the amplitude of each jitter component.

Note that the above signal voltages, currents, resistances, and other element parameters are not limitations of the invention. A designer can adjust these parameters according to different requirements. The circuit of the invention is not limited to the configurations of FIGS. 1-6. The invention may merely include any one or more features of any one or more embodiments of FIGS. 1-6. In other words, not all of the features displayed in the figures should be implemented in the power supply decoupling circuit of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A power supply decoupling circuit, comprising:
   a first operational amplifier, wherein the first operational amplifier has a positive input terminal coupled to a first reference voltage, a negative input terminal coupled to a common supply node, and an output terminal;
   a capacitor, coupled between the common supply node and the output terminal of the first operational amplifier;
   a source resistor, coupled between a supply voltage and the common supply node; and
   a stabilization circuit, coupled between the common supply node and a ground voltage, and stabilizing a voltage level of the common supply node when the voltage level of the common supply node is below a second reference voltage,
   wherein the common supply node is configured to drive external circuits with the supply voltage as power supply of the external circuits.

2. The power supply decoupling circuit as claimed in claim 1, wherein the source resistor is formed by a parasitic metal resistance of an integrated circuit layout.

3. The power supply decoupling circuit as claimed in claim 1, wherein the stabilization circuit comprises:
   a second operational amplifier, wherein the second operational amplifier has a positive input terminal coupled to the common supply node, a negative input terminal coupled to the second reference voltage, and an output terminal; and
   a second transistor, wherein the second transistor has a control terminal coupled to coupled to a relatively high supply voltage, and a second terminal coupled to the common supply node.

4. The power supply decoupling circuit as claimed in claim 3, wherein the stabilization circuit further comprises:
   a first transistor, wherein the first transistor has a control terminal coupled to the output terminal of the second operational amplifier, a first terminal coupled to the control terminal of the second transistor, and a second terminal coupled to the relatively high supply voltage; and
   a current sink, coupled between the first terminal of the first transistor and the ground voltage.

5. The power supply decoupling circuit as claimed in claim 3, wherein the relatively high supply voltage has a voltage level higher than that of the supply voltage.

6. The power supply decoupling circuit as claimed in claim 3, wherein the second operational amplifier uses the relatively high supply voltage as an operation voltage.

7. The power supply decoupling circuit as claimed in claim 1, wherein the second reference voltage has a voltage level slightly lower than that of the supply voltage.

8. A power supply decoupling circuit, comprising:
   a source resistor, coupled between a supply voltage and a common supply node, wherein the common supply node is configured to drive external circuits with the supply voltage as power supply of the external circuits;
   a decoupling capacitor, coupled between the common supply node and a ground voltage; and
   a stabilization circuit, stabilizing a voltage level of the common supply node when the voltage level of the common supply node is below a second reference voltage, comprising:
     a second operational amplifier, wherein the second operational amplifier has a positive input terminal coupled to the common supply node, a negative input terminal coupled to the second reference voltage, and an output terminal; and
     a second transistor, wherein the second transistor has a control terminal coupled to the output terminal of the second operational amplifier, a first terminal coupled to a relatively high supply voltage, and a second terminal coupled to the common supply node.

9. The power supply decoupling circuit as claimed in claim 8, wherein the source resistor is formed by a parasitic metal resistance of an integrated circuit layout.

10. The power supply decoupling circuit as claimed in claim 8, wherein the stabilization circuit further comprises:
    a first transistor, wherein the first transistor has a control terminal coupled to the output terminal of the second operational amplifier, a first terminal coupled to the control terminal of the second transistor, and a second terminal coupled to the relatively high supply voltage; and
    a current sink, coupled between the first terminal of the first transistor and the ground voltage.

11. The power supply decoupling circuit as claimed in claim 8, wherein the second reference voltage has a voltage level slightly lower than that of the supply voltage.

12. The power supply decoupling circuit as claimed in claim 8, wherein the relatively high supply voltage has a voltage level higher than that of the supply voltage.

13. The power supply decoupling circuit as claimed in claim 8, wherein the second operational amplifier uses the relatively high supply voltage as an operation voltage.

* * * * *